United States Patent [19]
Hao et al.

[11] Patent Number: 5,519,715
[45] Date of Patent: May 21, 1996

[54] FULL-SPEED MICROPROCESSOR TESTING EMPLOYING BOUNDARY SCAN

[75] Inventors: Hong Hao, Sunnyvale; Richard F. Avra, Los Altos; James C. Hunt, Redwood City; Kanti Bhabuthmal, Fremont, all of Calif.

[73] Assignee: Sun Microsystems, Inc.

[21] Appl. No.: 379,770

[22] Filed: Jan. 27, 1995

[51] Int. Cl.$^6$ .................................................. H04B 17/00
[52] U.S. Cl. ..................................... 371/22.3; 395/183.06
[58] Field of Search ............................... 371/22.3, 22.5, 371/22.6, 25.1; 395/183.06, 183.13, 183.10, 375; 364/260

[56] References Cited

U.S. PATENT DOCUMENTS

| | | | |
|---|---|---|---|
| 5,426,650 | 6/1995 | Ganapathy et al. | 371/22.3 |
| 5,434,804 | 7/1995 | Bock et al. | 364/579 |

OTHER PUBLICATIONS

"IEEE Standard Test Access Port and Boundary-Scan Architecture," vol. IEEE Standard 1149.1-1990.

*Primary Examiner*—Vincent P. Canney
*Attorney, Agent, or Firm*—Hickman Beyer & Weaver

[57] ABSTRACT

A method is disclosed for loading a compiled test program into a microprocessor's internal caches and then controlling the execution of that program. Initially, the microprocessor's internal clock is disabled. Then for each memory location specified in the compiled program, the memory content associated with that location is loaded into the appropriate microprocessor cache. This is accomplished in two primary steps. First, the memory content is shifted into positions on the pins of the microprocessor by a boundary scan shift operation via an IEEE 1149.1 interface. Second, after the pins have the appropriate bit values for the current memory content, an external clock supplies the microprocessor with clock cycles that are then used by the microprocessor to control the loading of data/instructions from the pins into the appropriate data or instruction cache. The process of loading the pins with data via boundary scan, and then shifting the data into appropriate caches is repeated for each memory content of the compiled program until all instructions in the program have been loaded into the appropriate caches. Thereafter, the microprocessor is forced into normal execution mode by resetting the microprocessor to reenable its internal clock. Finally, the test program is executed in a manner that allows a user to interact with the microprocessor during execution.

24 Claims, 12 Drawing Sheets

FULL-SPEED MICROPROCESSOR TESTING EMPLOYING BOUNDARY SCAN

BACKGROUND OF THE INVENTION

The present invention relates to methods of testing microprocessors. More specifically, the invention relates to methods of loading a test program into a microprocessor's internal caches and then controlling the execution of that program. The methods involve controlling the microprocessor's clock in a manner that allows a program's memory content to be efficiently shifted onto the microprocessor's pins and then loaded to the microprocessor's instruction and data caches.

During development of a microprocessor, it is necessary to extensively test for performance and bugs. Early in development, the microprocessor exists only as a software design specifying the device's Boolean logic (typically in a hardware design language such as Verilog). At this stage, various tests (collectively referred to as "design verification") may be performed on the microprocessor design. After a particular design is found acceptable, it is converted from software to hardware through a series of steps culminating in "tape out."0

Even though the hardware design language version of the microprocessor may have been extensively tested for performance and bugs during design verification, it is possible that errors were introduced during the process of converting the software microprocessor to the hardware microprocessor. Moreover, design verification may not cover all aspects of possible microprocessor operations. Thus, it is necessary to extensively test the silicon version of the microprocessor before it is ready for market introduction.

Various testers have been developed for this purpose. Two exeplary testers are the Polaris series VLSI testers available from Megatest of San Jose, Calif. and the Sentry series of testers available from Slumberger of San Jose, Calif. Such testers typically operate very fast but require connections to many of the microprocessor's pins (which typically number in the hundreds). Thus, testers typically are also very expensive. As a general rule, each pin on a tester adds $10,000 to the tester's total cost. Thus, there is a strong incentive to use testers having smaller numbers of pins.

The IEEE 1149.1 Standard—also referred to as JTAG (for Joint Task Action Group)—allows five dedicated pins to be used to access all pins on an integrated circuit chip. The JTAG standard architecture and methodology is described in the document "IEEE Standard Test Access Port and Boundary-Scan Architecture," IEEE Standard 1149.1-1990 which is incorporated herein by reference for all purposes. As will be explained in more detail below, a JTAG interface can be employed to load bit values on each pin of microprocessor by sequentially feeding these values through a single JTAG pin (the TDI pin) and shifting the bits along the perimeter of the microprocessor as a chain from pin-to-pin (a "boundary scan shift operation"). Ultimately, after the number of bits fed through the TDI pin equals the number of boundary scan cells (there is at least one boundary scan cell for each microprocessor pin) on the microprocessor, the bit values are in the correct locations on the microprocessor pins. At this point, the microprocessor is in a state which may be further tested as desired by the end user.

At least one microprocessor test system has employed the JTAG interface to load data on the pins of a device being tested. This system, which is provided on the SuperSPARC microprocessor available from Sun Microsystems of Mountain View Calif., allowed a user to load certain test programs into the microprocessor's onboard caches via an IEEE 1149.1 interface (JTAG) and execute them at the full functional clock rate. It also allowed a user to command the processor to temporarily halt execution of the normal instruction stream. Once halted, the user could direct the processor to execute any normal SPARC instruction (i.e., assembly language instructions for the SuperSPARC microprocessor) via the IEEE 1149.1 interface. The user could also resume the halted execution after performing the desired emulation functions. Unfortunately, the complex logic required for these functions represented a significant amount of area (on the SuperSPARC microprocessor) and worsened some critical timing paths. What is needed therefore is a system and methodology which provides the functionality of the above-described SuperSPARC test system without introducing substantial complexity to the microprocessor or interfering with the microprocessor's normal functioning.

SUMMARY OF THE INVENTION

The present invention is directed to a method of using boundary scan shift operations in conjunction with a clock control method to input and interact with a compiled test program executing on a microprocessor. Although the method may employ the above mentioned JTAG (IEEE 1149.1) interface to put data on and take data from the microprocessor's pins—as with the previous SuperSPARC system—it does so in a manner that simplifies the overall operation.

Initially, in the method of this invention, the microprocessor's internal clock is disabled. Then, for each memory location specified in the compiled program, the memory content associated with that location is loaded into the appropriate microprocessor cache. Loading memory content into the caches is accomplished in two primary steps. First, the content is shifted into positions on the pins of the microprocessor by a boundary scan shift operation. Second, after the pins have the appropriate bit values for the current memory content, clock cycles are provided to the microprocessor from an external clock. These clock cycles are then used by the microprocessor's internal logic to control the loading of data/instructions from the pins into the appropriate data or instruction cache. By controlling the pin to cache loading process with an external clock (as opposed to using the boundary scan chain as suggested by the authors of the IEEE 1149.1 standard), the program can be loaded into the appropriate caches in far fewer steps.

The process of loading the pins with data via boundary scan, and then shifting the data into appropriate caches is repeated for each memory content of the compiled program until all instructions and data in the program have been loaded into the appropriate caches. Thereafter, the method forces the microprocessor into normal execution mode by, among other possible steps, reenabling the microprocessor's internal clock. Finally, the method of this invention employs a protocol allowing the user to interact with the microprocessor during execution of the program. As explained below, this protocol includes many of the same steps used to load programs.

The present invention can be described as a microprocessor testing method having the following steps: (a) providing a compiled test program having multiple memory contents, each containing data or an instruction; (b) disabling the microprocessor's internal clock; (c) shifting a current memory content as a chain of bits onto the microprocessor's pins by a boundary scan shift operation; (d) providing clock cycles from an external source to the microprocessor's internal logic; (e) loading the data or instruction of the current memory content into a data or instruction cache of the microprocessor; (f) repeating steps c through e for successive memory contents until the memory contents of the test program has been stored in the data and instruction caches of the microprocessor; and (g) executing the test program.

In preferred embodiments, steps c through f are controlled by a controller employing an IEEE 1149.1 interface. In such methods, a further step of "updating" the current memory content on the microprocessor's pins will be performed. Updating in this context refers to an operation by which the IEEE 1149.1 interface shifts the bit values on the pins to registers which are accessible to the microprocessor's internal logic. This step sets the stage for the subsequent step of loading the values on the pins to the microprocessor's internal caches.

In further preferred embodiments, the microprocessor has a memory chip mode (referred to as an SRAMe_TEST_MODE in SuperSPARC II microprocessors) in which data can be loaded into the microprocessor's data and instruction caches from its pins as if the microprocessor was a memory chip (e.g., an SRAM). The goal of this feature is to make the loading operation more efficient (requiring about six clock cycles in the case of a SuperSPARC II microprocessor). Typically, the microprocessor can be placed in the memory chip mode by making a designated microprocessor pin active (e.g., an SRMTST_pin in the case of a SuperSPARC II microprocessor).

Typically, the compiled test program is provided as a file of boundary scan vectors, each of which represents a boundary pin bit pattern for a memory content. Thus, each such vector includes address and data bits aligned within the vector such that they will be shifted onto corresponding dedicated address and data pins of the microprocessor when the step of shifting the current memory content onto the microprocessor's plurality of pins is completed. The vector may, in addition, include a bit aligned to correspond with a memory chip mode pin on the microprocessor.

After the compiled program is loaded into the microprocessor's instruction and data caches, it is executed. During execution, the compiled program may periodically put data on the microprocessor's pins where it can be sampled by a JTAG tester. In this manner, the status of execution may be monitored. If necessary, data can be input or retrieved from the microprocessor by the following steps: (a) freezing execution of the compiled program on the microprocessor by disabling the microprocessor's internal clock; (b) retrieving information stored in the microprocessor (or shifting information onto the microprocessor's pins) while execution is frozen; and (c) resuming execution of the compiled program on the microprocessor by reenabling the microprocessor's internal clock.

Another aspect of the invention provides a system for implementing the above described methodology. In a preferred embodiment, such system can be characterized by the following elements: (a) a test controller for controlling the loading of memory contents from a compiled program to the microprocessor's internal caches (the test controller should be capable of inputting information to the microprocessor through a subset of the microprocessor's pins via boundary scan shift operations); (b) electrical connectors between the test controller and the subset of the microprocessor's pins; and (c) a clock controller which has the capability of disabling the microprocessor's internal clock and also has the capability of providing clock signals from an external source to the microprocessor. In preferred embodiments, the test controller is provided as an IEEE 1149.1 add-on card in a workstation while the clock controller is provided on the microprocessor itself.

These and other features of the present invention will be presented in more detail in the following specification of the invention and the figures.

DESCRIPTION OF THE PREFERRED EMBODIMENTS

1. Physical Embodiment

The invention employs various process steps involving data stored in computer systems. These steps are those requiring physical manipulation of physical quantifies. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms, such as identifying, running, shifting or updating. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

Figure 1A:
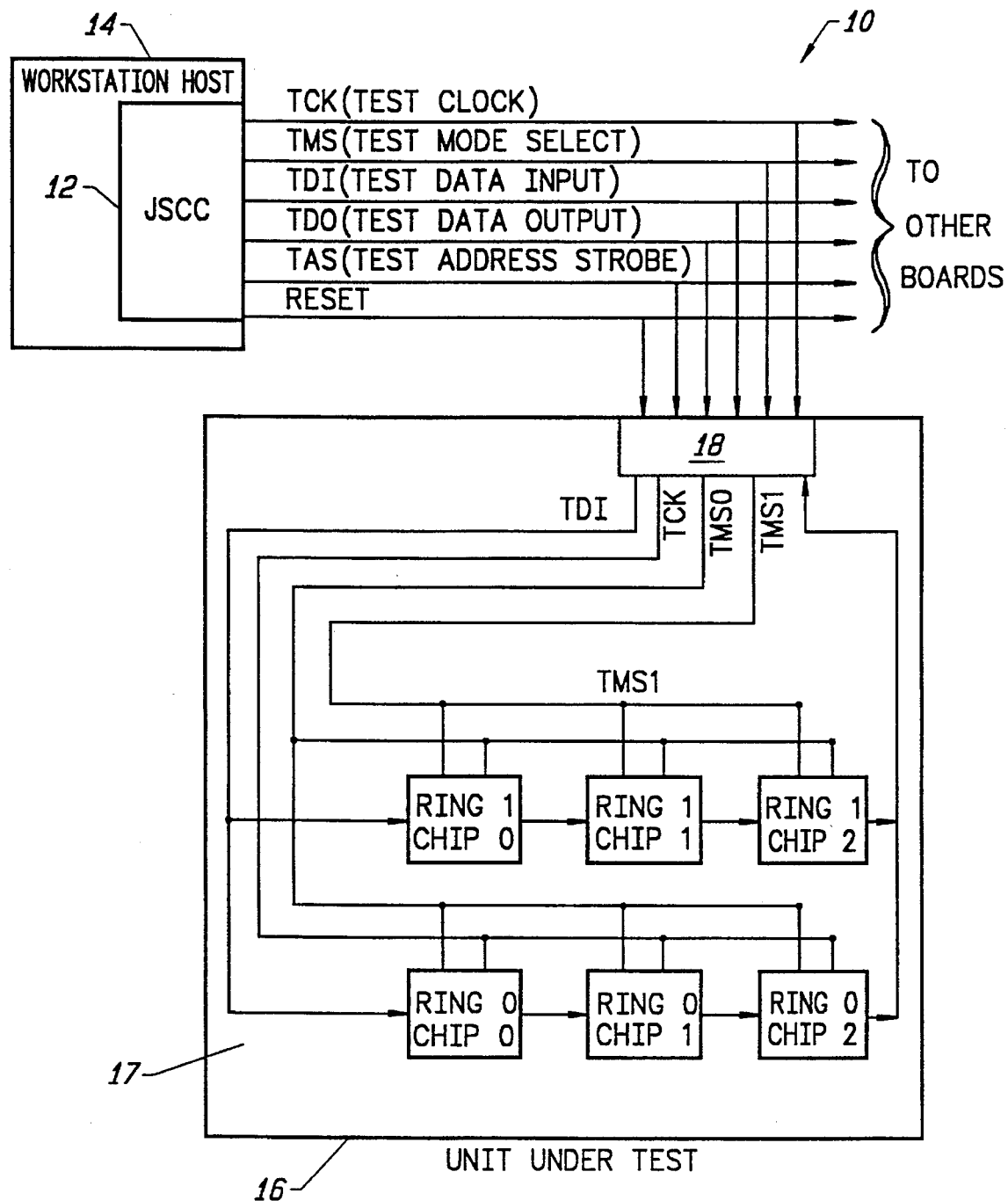
FIG. 1A an illustration of a hardware set-up employed to conduct tests on microprocessors accordance with the methods of this invention.

FIG. 1A is an illustration of one system 10 for implementing the methods of this invention. In this system, a JTAG interface (to a target system 16) is provided by a JTAG Scan Controller Card (JSCC 12) on workstation host 14. In a preferred embodiment, the JSCC card 12 is provided on a SPARCstation available from Sun Microsystems Inc. of Mountain View, Calif. The JSCC card itself can be obtained from Sun Microsystems Inc. In further preferred embodiments, the JSCC card provides the logic for Sun Microsystems "JTAG+" implementation of JTAG. Another available JTAG tester is "TI Asset" available from Texas Instruments. As shown in FIG. 1A, target system 16 ("unit under test") contains six test chips all provided on a board 17. These chips are arranged in two rings (Ring 0 and Ring 1) of three chips each. Other arrangements are, of course, also acceptable. JTAG signals to and from the chips are provided through connector 18. In addition, the signals from JSCC 12 are provided to other boards in addition to board 17. As will be explained below, the JTAG interface requires five pins: TCK (Test Clock), TMS (Test Mode Select), TDI (Test Data Input), TDO (Test Data Output), and TAS (Test Address Strobe). In addition, the JTAG Scan Control Card 12 provides reset signal.

Figure 1B:
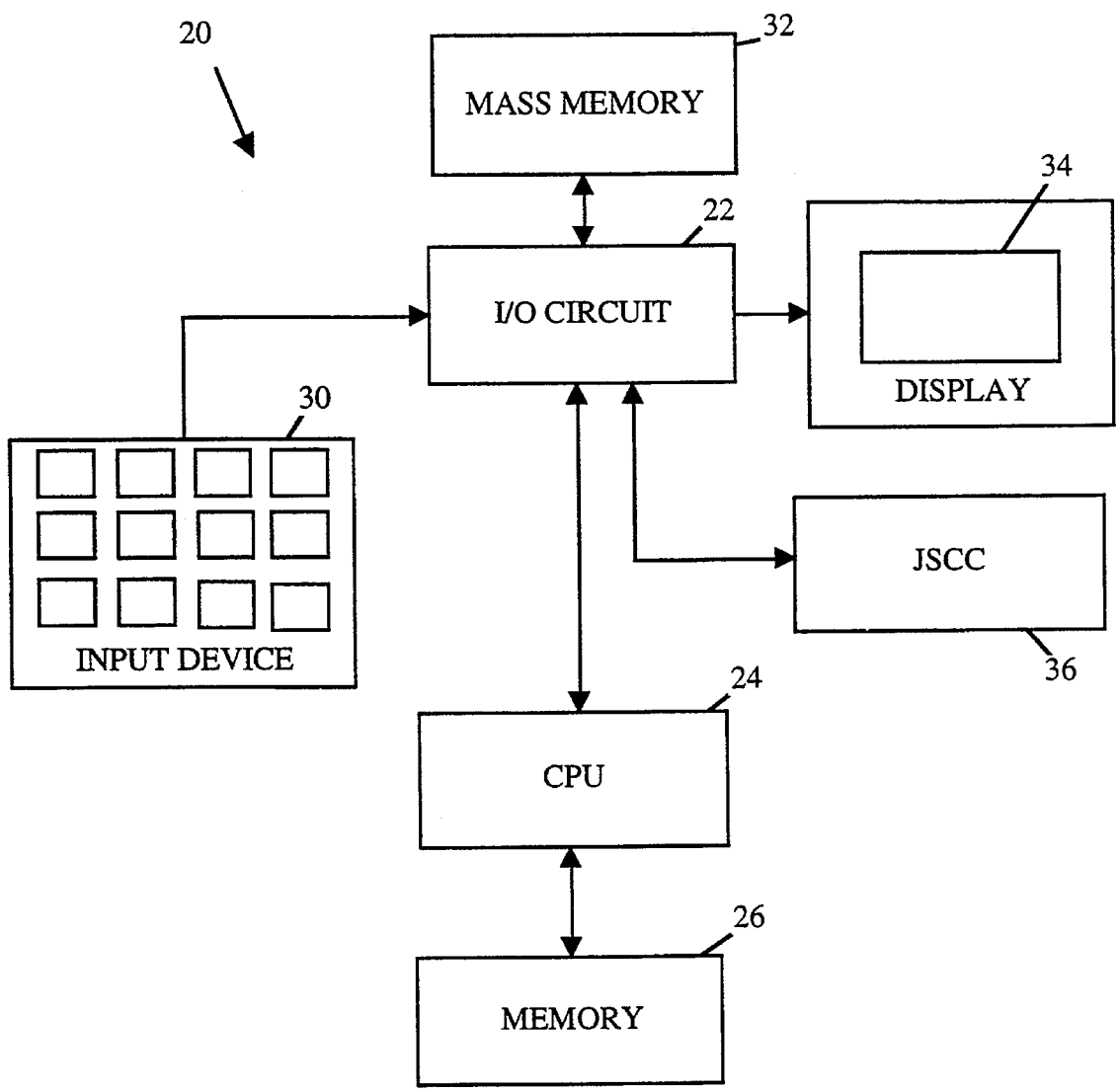
FIG. 1B is a block diagram of a digital computer suitable for implementing a system in accordance with this invention.

FIG. 1B illustrates a typical computer-based system used with a JSCC 36 to implement the present invention. Shown is a computer 20 which includes an input/output circuit 22 used to communicate information in appropriately structured form to and from the parts of computer 20 and associated equipment, a central processing unit 24, and a memory 26. These components are those typically found in most general and special purpose computers 20 and are intended to be representative of this broad category of data processors. Typically, the JTAG Scan Controller Card 36 is coupled to the input/output circuit 22 through which it interacts with the other components of computer 20. As mentioned, the JSCC 36 contains the logic for an IEEE 1149.1 interface.

FIG. 1B also illustrates an input device 30 shown as a keyboard. It should be understood, however, that the input device 30 may actually be a transducer card reader, a magnetic or paper tape reader, a tablet and stylus, a voice or handwriting recognizer, or some other well-known input device such as, of course, another computer. A mass memory device 32 is coupled to the input/output circuit 22 and provides additional storage capability for the computer 20. The mass memory device 32 may be used to store programs, data and the like and may take the form of a magnetic or paper tape reader or some other well known device. It will be appreciated that the information retained within the mass memory device 32, may, in appropriate cases, be incorporated in standard fashion into computer 20 as part of the memory 26.

In addition, a display monitor 34 is illustrated which is used to display the images being generated by the present invention. Such a display monitor 34 may take the form of any of several well-known varieties of cathode ray tube displays, flat panel displays, or some other well known type of display.

As is well-known, the memory 26 may store programs which represent a variety of sequences of instructions for execution by the central processing unit 24. For example, the compiled test programs for executing on a device under test may be stored within the memory 26.

2. Implementation of the Invention

Figure 2:
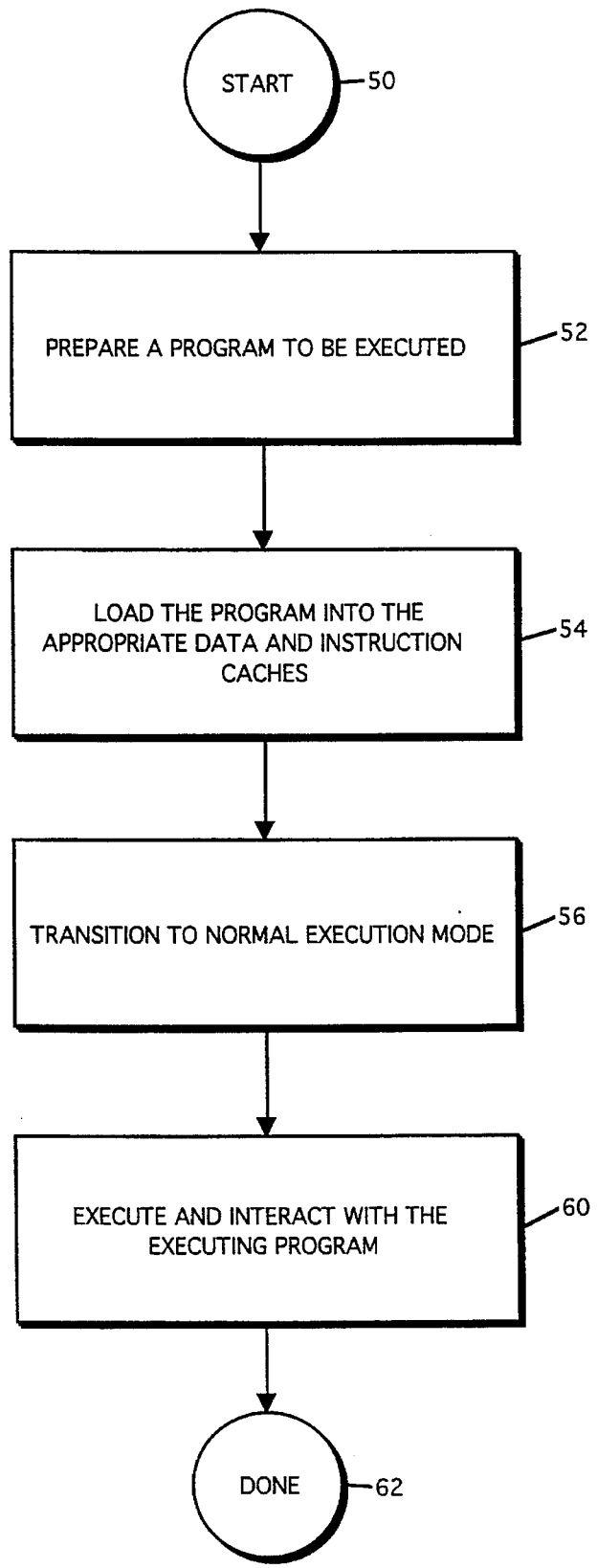
FIG. 2 is a process flow diagram representing an overview of the methods employed in this invention.

An overview of the process of the current invention is provided in FIG. 2. As shown, the process contains four primary steps. It begins at 50 and continues with a step 52 at which a test program is prepared for execution in accordance with this invention. The details of this step will be provided in FIG. 3 and the associated discussion below. After the program has been appropriately prepared, the program is loaded, at a step 54, into the appropriate microprocessor caches (i.e., the microprocessor's instruction and data caches). Next, at a step 56, the microprocessor transitions to a normal execution mode. Finally, at a step 60, the program is executed in a manner that allows a user to interact with the executing program. The process is then concluded at 62.

Before the process of this invention can begin, a test program must be provided. It should be understood that a test program is typically designed to uncover performance problems and/or bugs in a microprocessor. However, there is in principle no reason why the methods of this invention could not also be employed to load and execute programs for other purposes.

Figure 3:
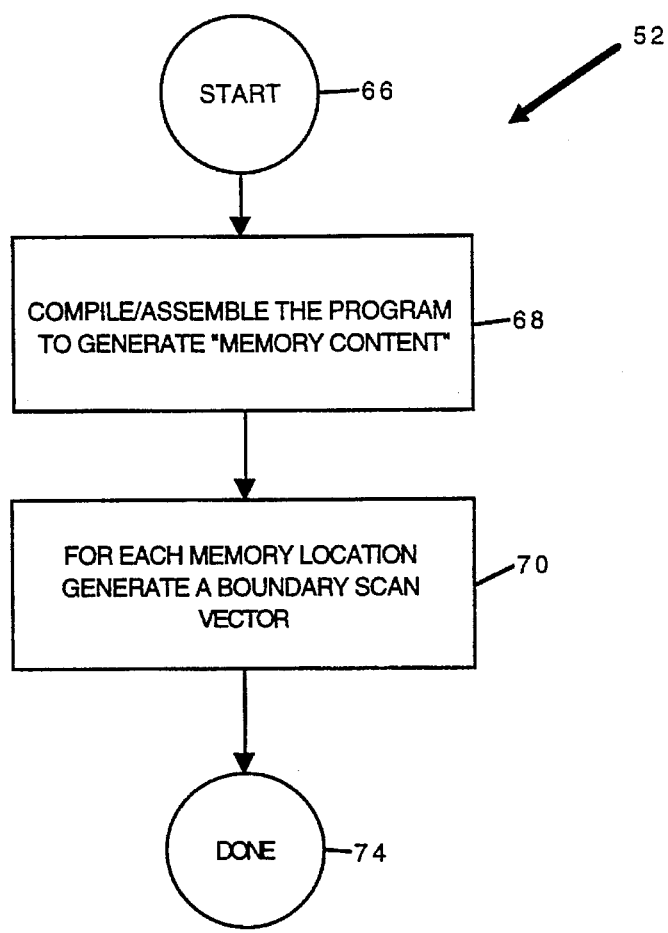
FIG. 3 is a process flow diagram illustrating the major steps employed to prepare a program for execution in accordance with this invention.

The process of preparing a test program to be executed in accordance of this invention is detailed in FIG. 3. As shown there, the process begins at 66 and then, at a step 68, the program is compiled and assembled into binary code. The compilation procedure automatically generates a memory map that assigns specific addresses in the instruction and data caches for the instruction and data segments of the program. The data and instructions produced as a consequence of compilation is referred to as the program's "memory contents." It should be noted that the process recited in step 68 is conventionally performed anytime a program is compiled and assembled, for any purpose, not just for JTAG testing in accordance with this invention. After the memory map has been prepared, the memory contents are extracted and configured to produce boundary scan vectors at a step 70. One such vector is generated for each memory location specified in step 68. The process then concludes at 74.

A program's memory contents will now be discussed in more detail. During compilation and assembly, each assembly language instruction is converted to one or more memory contents. Each such memory content can be characterized as being either an "instruction" memory content or a "data" memory content. For each assembly language instruction, there will be one "instruction" memory content for the instruction itself. This memory content specifies the binary code for the machine instruction itself. The memory map provides an address in the microprocessor's instruction cache where that machine instruction will be stored (subsequently in the process). In addition to the memory content for the instruction itself, a given machine instruction may require one or more additional memory contents for data in the instruction. For example, an "ADD" instruction may specify one or more pieces of data which are to be added. Compilation of such instruction will specify corresponding memory contents for the pieces of data to be added in accordance with the instruction. Each such "data" memory content will be mapped to an address in the microprocessor data cache where the piece of data will be stored. Thus, each machine instruction of the test program will have one "instruction" memory content, and may have one or more "data" memory contents.

Since the program is to be loaded via boundary scan, step 70 is required to map the data or instruction of each memory content (which may be of either the "instruction" or "data" type) to the data pins and the corresponding address to the address pins of the microprocessor under test. This step generates one boundary scan vector for each memory content in the compiled test program. Each such vector contains positions for all boundary scan "cells" on the microprocessor. In the case of SuperSPARC II microprocessor available from Sun Microsystems, there are about 180 pins and 306 cells. The number of microprocessor cells represents the number of bits that can be input or output to or from the microprocessor at any given time. Each pin has at least one associated cell. Thus, some pins may have two or even three associated cells.

For purposes of this invention, only a fraction of the total number of cells on the microprocessor is used to input data and instructions (in the form of boundary scan vectors). Specifically, the pins or cells of interest are (1) those specifying data or an instructions (the data pins), (2) those specifying an address for the data or instructions, (3) the one specifying "SRAM test mode" (which will be explained in more detail below), and (4) those specifying whether the operation is to write into or read from the on-chip memory. The other pins (and associated cells) are generally irrelevant to inputting data and instructions, and therefore are preferably set to zero.

Figure 4A:
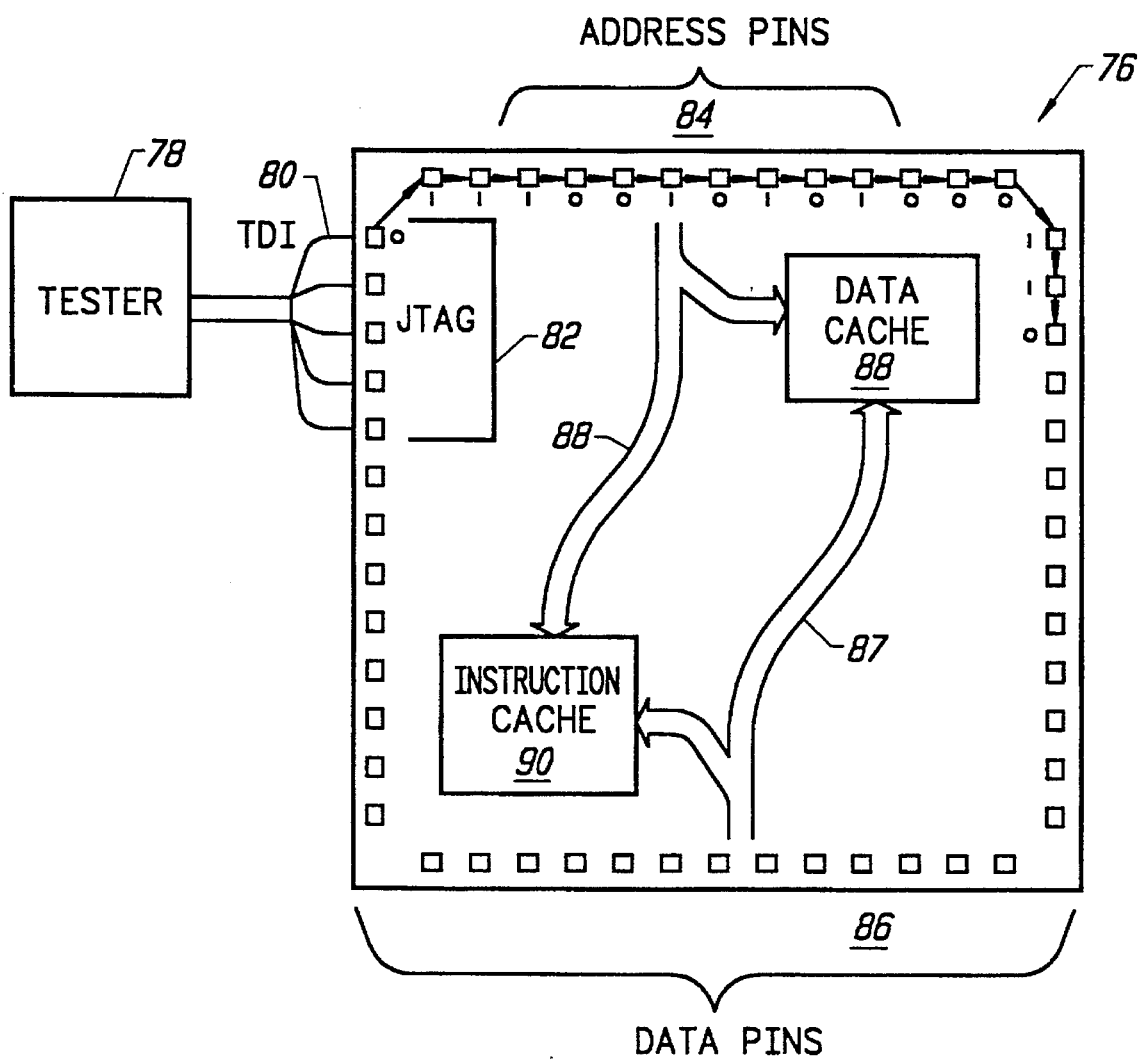
FIG. 4A is an illustration depicting a hypothetical microprocessor on to which data is loaded through a JTAG controller.
Figure 5:
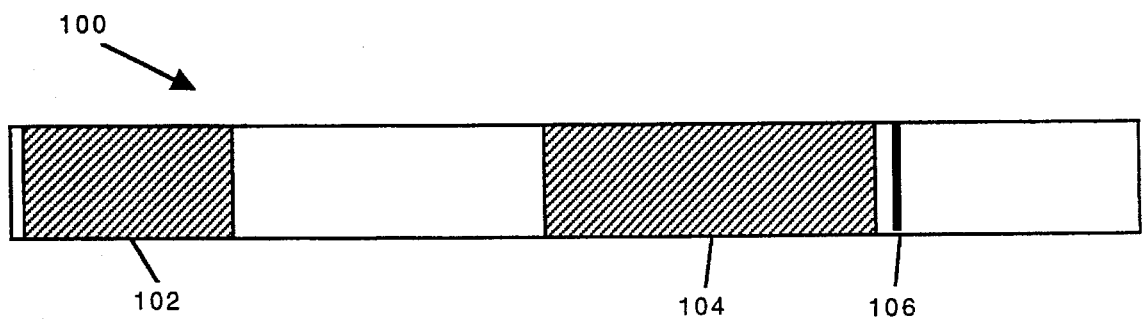
FIG. 5 is an illustration of a boundary scan vector used to input memory contents of a compiled program onto the pins of a microprocessor in accordance with the methods of this invention.

The content of a boundary scan vector will now be further described with reference to FIGS. 4A and 5. FIG. 4A shows a hypothetical simplified microprocessor 76 having multiple pins on its perimeter. Some of these pins, specifically pins 84, are address pins which collectively specify the address of data (the data being either binary code for a machine instruction or data used in the execution of a machine instruction) residing on other pins, data pins 86. The address on pins 84 will specify a location in a data cache 88 or in an instruction cache 90, depending upon the type of data on pins 86. In a subsequent step, the data residing on data pins 86 will be loaded into the address specified by address pins 84 (as indicated by arrows 87 and 88).

A JTAG controller 82 can be used to load bits one-by-one from JTAG tester 78 through a TDI pin to the microprocessor. In this invention, the bits to be loaded are provided in the form of boundary scan vectors such as boundary scan vector 100 shown in FIG. 5. As noted, each such boundary scan vector provides the information for a separate memory content from a compiled program. Further, each boundary scan vector will include an address section 102 and data section 104. The address section 102 specifies an address in data cache 88 or in instruction cache 94 for data contained in boundary scan vector section 104. The data contained in section 104 can, of course, be either binary code for a machine instruction or data used in execution of a machine instruction. The boundary scan vector 100 is sufficiently large to accommodate one bit for each cell on the microprocessor. Thus, sections 102 and 104 are offset by a number of bits equal to the number of cells that separate the address and data cells on microprocessor 76.

It should be noted that boundary scan vectors for use in this invention are easily generated by specifying the address pin values in section 102 and the data pin values in section 104. If the pin/cell layout of the microprocessor is known, the appropriate offsets can be generated automatically. In addition, some other pins, e.g., a memory chip test mode pin 106 and read or write pins (not shown), may need to be set. The offset between these pins and the address and data must, of course, also be specified. The remaining pins (i.e., those which are not address or data pins or some other significant pins) can be set to any value, e.g., zero. All of the boundary scan vectors for a given compiled program are stored in a file which is read by the JTAG controller when loading the program to the appropriate data and instruction caches.

When the processor 76 is in JTAG test mode, the boundary scan vectors are loaded onto the cells through a JTAG pin known as TDI pin 80. As explained below, the boundary scan vector is loaded bit-by-bit though TDI pin 80 into the cells on the periphery of microprocessor 76. As shown by the arrows, the bits of boundary scan vector 100 are shifted by one bit for each cycle until the entire boundary scan vector has been loaded on to the cells of microprocessor 76.

Figure 4B:
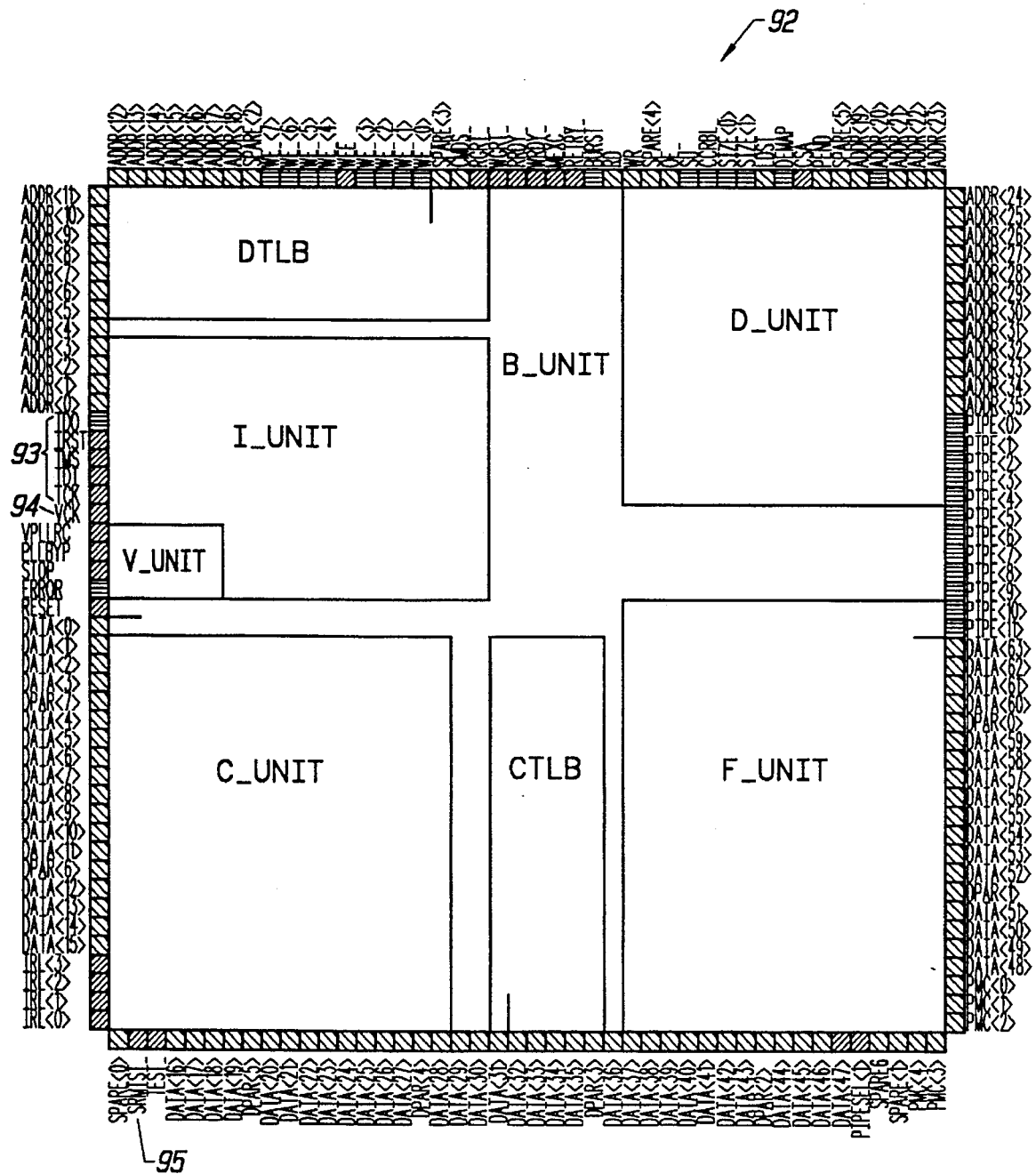
FIG. 4B is an illustration of the architecture and pin layout of a SuperSPARC II microprocessor

FIG. 4B is an illustration of the SuperSPARC microprocessor 92 available from Sun Microsystems and is presented to illustrate the layout of an actual microprocessor (for comparison to the hypothetical simplified processor shown in FIG. 4A). As can be seen, address pins 0–18 of this microprocessor are provided beginning at the first location above JTAG pins 93 and wrap around the microprocessor periphery. Address pins 19–35 are separated from these first 19 address pins by 32 non-address pins. Thus, any boundary scan vector must account for these 32 pins and any extra associated cells (as offset between sections of the address). It should be noted that during write operations (used to load instructions and data into the on-chip memory), pins CMDS and WR located 12 and 21 pins from the address pin 18 must be set to active. Further, during read operations (discussed below in the context of execution), the pin RD located 20 pins from address pin 18 must be set to active. A VCK (clock) pin 94 is located immediately below JTAG pins 93. Then data pins 0–15 are located 6 pins further down on the SuperSPARC periphery. Six pins later, the SRMTST_pin 95 appears. As explained above, this pin is used to set microprocessor 92 to a memory chip mode. Data pins 16–63 follow in eight different groups.

The significant internal modules of the SuperSPARC architecture are also detailed in FIG. 4b. First, the "C_UNIT" contains the processor's instruction cache and associated controller. The "D_UNIT" contains the corresponding data cache and controller. The "I_UNIT" contains the processor's integer logic and the "F_UNIT" contains the processor's floating point logic. The "V_UNIT" contains the logic for the processor's clock and JTAG controllers. Next, the "CTLB" contains the processor's memory management unit and the "DTLB" contains the processor's data translation look-ahead buffer. Finally, the "B_UNIT" contains the processor's bus logic.

Figure 6:
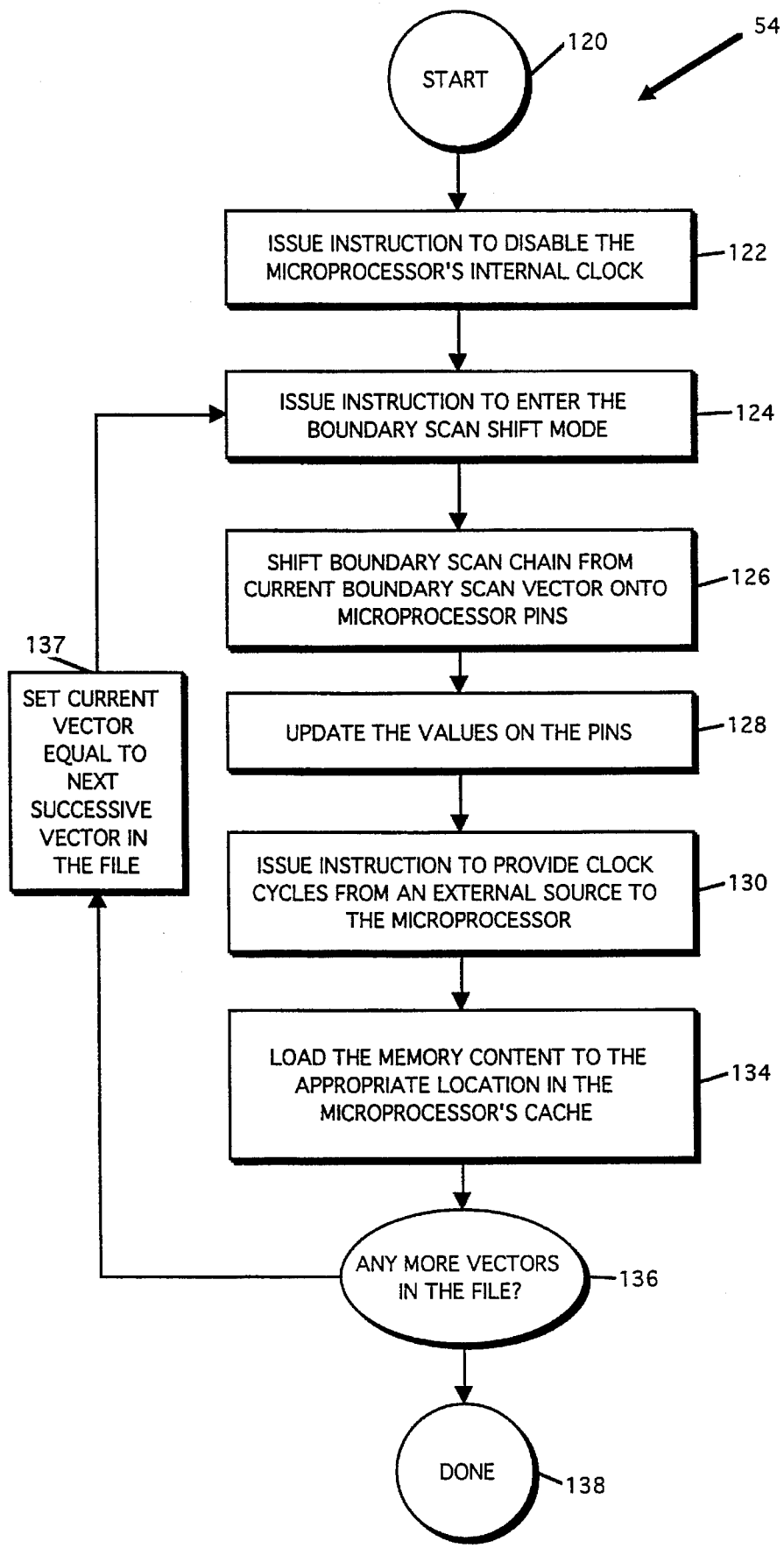
FIG. 6 is a process flow diagram depicting the major steps employed to load a test program into appropriate data and instruction caches in accordance with this invention.

Details of the process for loading the program into appropriate data or instruction cache locations (step 54 of FIG. 2) are provided in FIG. 6. The process begins at 120 with the microprocessor being reset by, for example, powering on the microprocessor. Thereafter, at a step 122, the microprocessor's internal clock is disabled. This step is provided so that as long as another test mode is active, the internal clock will stay inactive. At this point, the process is ready to load the first instruction from the compiled program.

At a step 124, the process enters boundary scan shift mode. Using the IEEE 1149.1 interface, this is accomplished by issuing the instruction is "INTEST." Thereafter, at a step 126, the IEEE 1149.1 controller shifts the current boundary scan vector into the microprocessor cells bit-by-bit. As mentioned, this process is depicted in FIG. 4A. After the current boundary scan vector is loaded and aligned to the proper cells on the microprocessor, the JTAG controller automatically updates the vector values on the cells at step 128. As noted, this process involves shifting the data in the cells to a state which can be accessed by the microprocessor's internal logic. After the boundary scan vector has been updated, the process issues an instruction, at a step 130, to provide clock cycles to the microprocessor from an external source. In preferred embodiments, the externally issued clock cycles are provided from a clock in the JTAG controller itself.

At this point, a process step 134 loads the data (machine instructions or data employed in executing machine instructions) provided in the current boundary scan vector to the appropriate location in the microprocessor's data or instruction cache. This is accomplished automatically by the microprocessor's internal logic upon receiving clock cycles from the JTAG controller. In preferred embodiments, the loading process is performed while the microprocessor is in a special memory chip mode which makes the loading process more efficient. For the SuperSPARC II microprocessor in SRAM test mode, about six clock cycles are required to load the data from an updated boundary scan vector into the appropriate data or instruction cache.

After the instruction or data has been loaded at step 134, a decision step 136 determines whether there are any more boundary scan vectors in the file for the compiled program. If the last vector in the file has been processed (i.e., the entire program has been loaded into the appropriate instruction and data caches), the process is completed at 138. If, however, there are additional vectors to be processed in the file, a step 137 sets the current boundary scan vector equal to the next successive vector in the file. Process control then returns step 124 were the JTAG instruction INTEST is again issued to cause the system to enter boundary scan shift mode. Thereafter, steps 126, 128, 130, 134, and 136 are repeated to load the memory content from the next successive boundary scan vector into to the appropriate data or instruction cache location.

With regard to the step of disabling the microprocessor's internal clock (step 122), this process is preferably accomplished by issuing a disable instruction which is recognized by a specially designed clock controller on the microprocessor. In a preferred embodiment, this instruction takes the form of a private instruction provided through the IEEE 1149.1 controller. One such instruction is "BSCAN_STOP" which is used with a clock controller described in U.S. patent application Ser. No. 08/379,159 (attorney docket no. P753), filed on Jan. 27, 1995, naming Hao and Bhabuthmal as inventors, entitled "METHOD AND APPARATUS FOR FULLY CONTROLLABLE INTEGRATED CIRCUIT INTERNAL CLOCK", and incorporated by reference herein for all purposes. As is known to those of skill in the art, IEEE 1149.1 provides various standard public instructions which are available to all users. In addition, IEEE 1149.1 supports private instructions (such as BSCAN_STOP) which may be developed for special applications by users of the IEEE 1149.1 interface.

With regard to the step of shifting a boundary scan chain onto the microprocessor pins (step 126), this step is preferably performed using the IEEE 1149.1 INTEST mode. In all vectors loaded by this process, the SRMTST pin (or other memory mode pin for non-SPARC microprocessors) should be set to active (see position 106 of the boundary scan vector or FIG. 5). This forces the SuperSPARC II into the special SRAM test mode in which the microprocessor's on-chip memory can be written to and read from the pins as if the microprocessor was a SRAM chip. In addition, all vectors should have the CMDS and WR pins set to active so that the microprocessor is instructed to write the instructions or data on the data pins to the onboard caches.

With regard to step 128, when a boundary scan vector is updated by the IEEE 1149.1 controller, the vector values appear—for the first time—on all the input cells of the microprocessor. However, since the microprocessor's internal clock is disabled (by virtue of step 122), the vector is not automatically propagated into the microprocessor.

With regard to steps 130 and 134, a certain number of internal clock pulses are needed to load the data from the microprocessor's data pins to the on-chip memory location specified on the address pins. This is preferably done by entering another IEEE 1149.1 private instruction, called ISSUE_TCK, into an IEEE 1149.1 controller's instruction register and issuing as many cycles as the number of internal clock pulses needed. (As mentioned above, this is about six cycles.) This instruction allows the TCK clock (provided by the JTAG interface) to be used as the microprocessor's internal clock. After the desired number of clock pulses, the specified memory location is loaded with the specified data. It should be noted that the use to the ISSUE_TCK instruction in a specially designed clock controller is described in U.S. patent application Ser. No. 08/379,159, (attorney docket no. P753) which was previously incorporated herein by reference. It should also be noted that no boundary scan vectors are shifted onto the microprocessor's pins while the information is being loaded into the microprocessor's caches because the ISSUE_TCK instruction does not select any particular scan chain. Boundary scan shifting can only occur when a particular vector is presented to the TDI pin in response to an appropriate IEEE 1149.1 instruction.

The SRAM loading via boundary scan as described above is repeated for all vectors generated in step 70 of FIG. 3. At the end of SRAM loading, the instructions and data for the test program are all within the microprocessor. The entire step is performed via the IEEE 1149.1 interface and using the TCK clock. It is worth noting that the SRAM test mode is not necessary for practicing this invention. In most microprocessors, a memory chip test mode adds convenience and efficiency in loading the caches. In general, however, the loading can be done thorough the boundary scan chain INTEST mode and ISSUE_TCK, since the processor can be made to execute any normal instruction form the pins, including those that write to the on-chip caches.

It should also be noted that the IEEE standard technique for issuing the necessary clock cycles to load data from the pins into the appropriate caches would involve using of the VCK pin (reference number 94 in FIG. 4B) which controls the internal clock of a microprocessor (e.g., a superSPARC II microprocessor). Unfortunately, this approach would involve very many cycles to complete the loading process. Specifically, for each of the six internal clock cycles needed to load the values on the pins into an internal cache, the boundary scan vector would have to be shifted on to the cells twice. Thus, for a SuperSPARC II microprocessor, the loading process would require at least 306×6×2 clock cycles. The factor of two is necessary to represent each complete clock cycle. Specifically, each clock cycle has a rising edge and a falling edge, and is therefore represented as two bits: a zero and a one for each cycle. Thus, two boundary scan vectors are required, one having the VCK pins set equal to one and the other having the VCK pin set equal to zero.

By using the JTAG controller's clock through the TCK pin, many fewer cycles are required to load data to the internal caches. Specifically, 306 cycles are required to load to the data on the pins and another six cycles are required to load that data into appropriate caches. There may be a certain number of additional "overhead" cycles associated with this process, but, all told, the required number of cycles is reduced by about a factor of 10 or 11.

Figure 7:
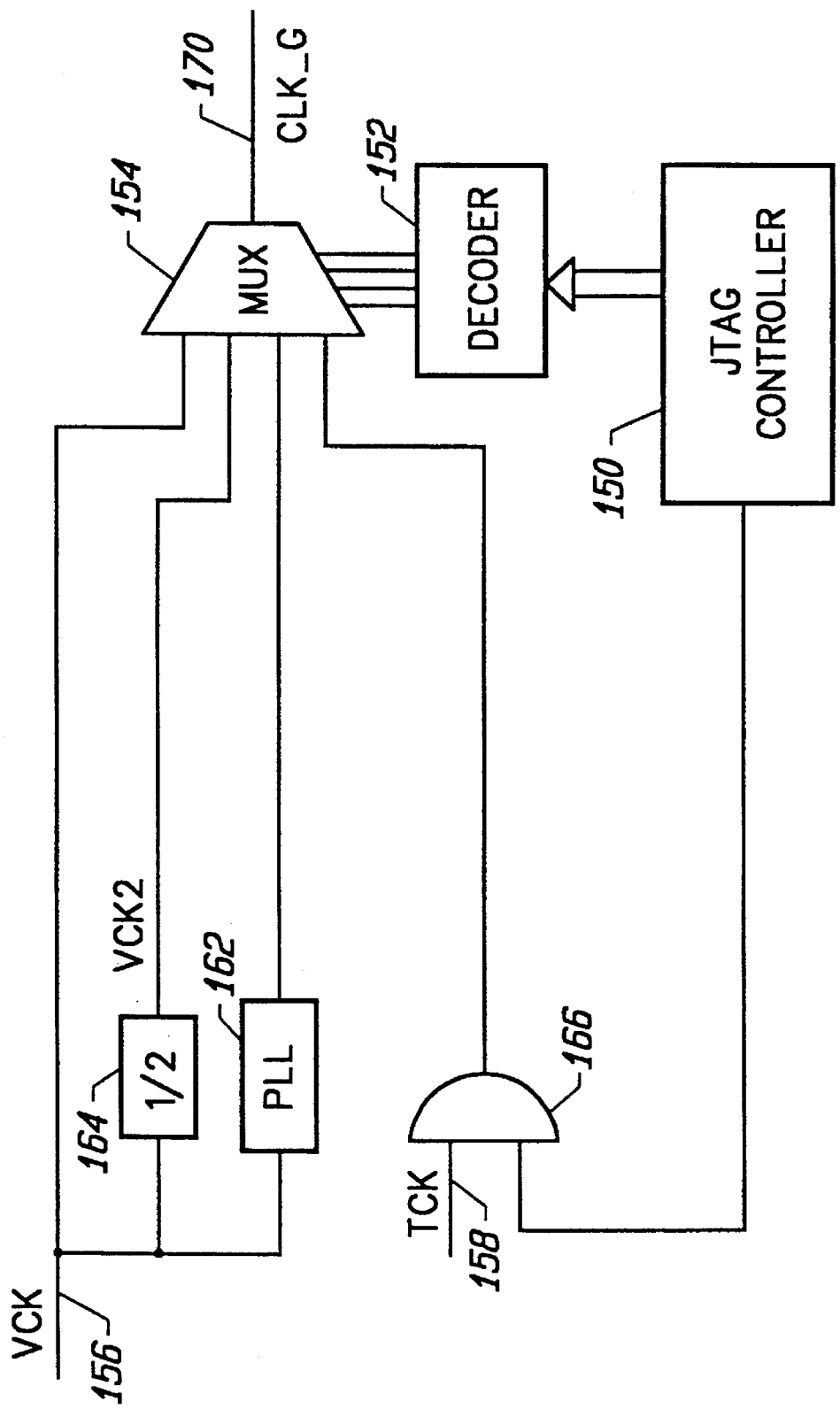
FIG. 7 is a block diagram illustrating the major components of a clock controller employed in a preferred embodiment of the present invention.

FIG. 7 presents a block diagram of a clock controller having the functionality necessary to implement the invention as described above. Preferably, the clock controller logic is provided on the microprocessor itself. A JTAG controller 150 provides the logic to select between various clock sources and provide a single clock signal 170 to the microprocessor's internal logic. The clock signals represented in FIG. 7 are selected from the following sources: (1) a clock signal VCK 156 provided by a generic source external to the microprocessor, (2) a phase lock loop source 162 which is generated on the microprocessor by an analog oscillator, and (3) a JTAG generated clock signal TCK 158. In addition, a one-half speed clock signal is available by passing signals from either the VCK source 156 or the PLL 162 through a block 164.

One of the four above-mentioned clock sources is selected by a multiplexer 154 to be the microprocessor's internal clock signal 170. The selection is controlled by a decoder 152 which is electrically coupled to both multiplexer 154 and JTAG controller 150.

As noted above, a BSCAN_STOP instruction will disable the microprocessor's internal clock. This is because a BSCAN_STOP instruction causes the JTAG controller 150 to (1) select the TCK signal 158 at multiplexer 154, and (2) disable the TCK signal at a gate 166. Thus, the microprocessor will see no internal clock signal 170 after a BSCAN_STOP instruction has been issued to JTAG controller 150. The TCK signal can be reenabled at gate 166 by issuing an ISSUE_TCK instruction to JTAG controller 150.

After a program is loaded into the microprocessor, the program still cannot be started by itself. A transition sequence must be executed to get the microprocessor into normal execution mode. In preferred embodiments, this transition sequence includes a chip reset, a boot routine, cache tag writes, and a start up of the user program. During this transition, the caches are still disabled and all the instructions in the transition sequence are fetched from outside the microprocessor via boundary scan. Thus, the transition sequence is pre-compiled and all boundary scan vectors are extracted for all pins for the sequence. These vectors are entered into the microprocessor following the same steps as set forth in FIG. 6 for loading into the on-chip memories, except that for each boundary scan vector only one internal clock pulse is issued now and the chip is not set into SRAM test mode. At the end of the transition sequence, a jump is made to the beginning of the user program at address 0.

Figure 8:
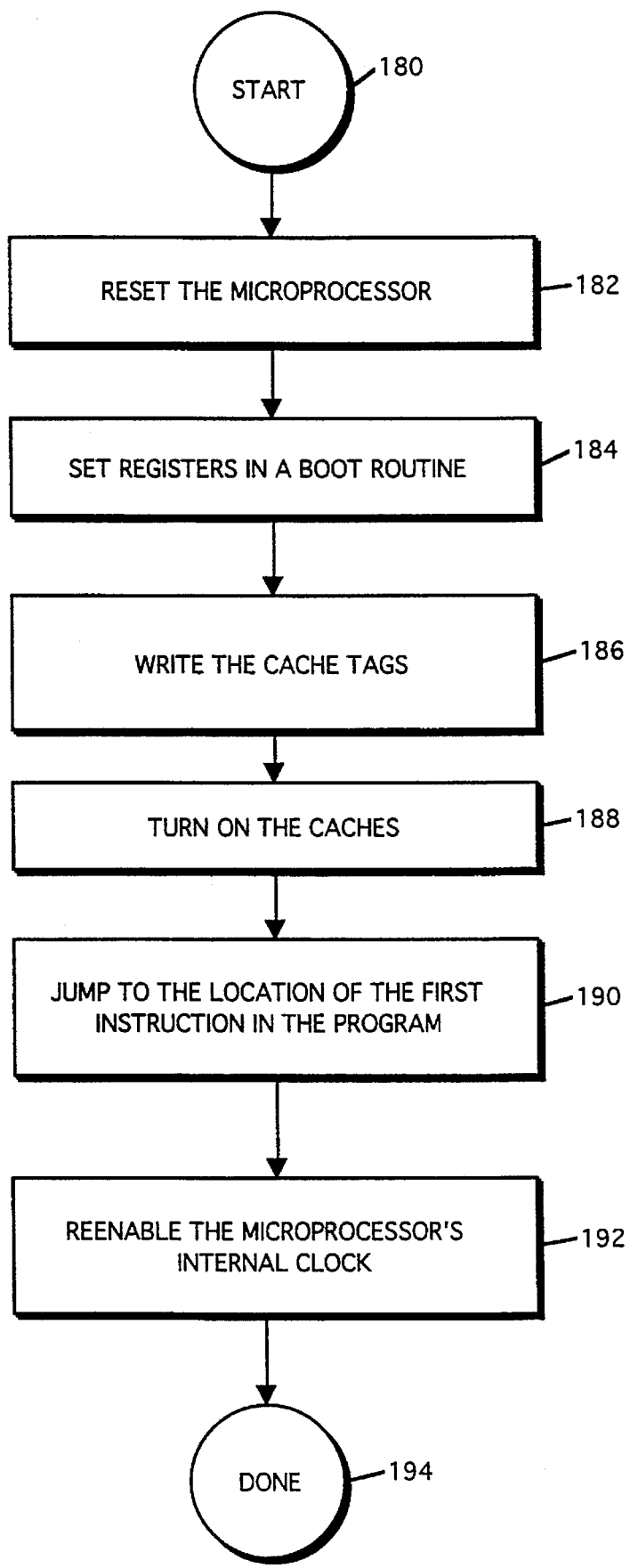
FIG. 8 is a process flow diagram depicting the major steps employed to transition the microprocessor to normal execution mode after the test program has been loaded into appropriate data and instruction caches.

FIG. 8 details the process by which the microprocessor is transitioned to normal execution mode after the compiled program has been loaded to the microprocessor's internal caches. The process begins at 180 and at a step 182, the microprocessor is reset. This automatically occurs when the processor is powered on, which will normally be required when a compiled program is to be executed in accordance with this invention. It should be noted that a SuperSPARC II microprocessor can be reset by issuing 16 consecutive clock cycles using, for example, the ISSUE_TCK instruction described above while forcing the RESET pin to be active through the boundary scan. Next, at a step 184, a boot routine is performed in which sets various registers in the microprocessor. Each register can be set in a single clock cycle. Generally, the determination of which specific registers are set in this step depends upon the type of the microprocessor under test. Boot routine steps for a SuperSPARC II microprocessor are set forth below.

After the boot routine is complete, a process step 186 writes the cache tags for the compiled program's instructions and data which are now stored in the microprocessor's caches. It should be noted that the cache tags were cleared when the processor was reset at step 182. Each cache address has a "tag" as part of that address. When the processor is looking for instructions or data, it first compares the tag to determine if the instruction or data is inside a cache. If there is no tag match, then the microprocessor recognizes that the instruction or data is not inside a cache. In SuperSPARC, the cache tags are stored in an array of 64 memory locations, each of 32 bits. To write cache tags to these locations (step 186), the file of boundary scan vectors includes some vectors (near the end of the file) which contain the tags and their corresponding addresses in the memory array. Thus, the cache tags are written with instructions applied at the pins through boundary scan and ISSUE_TCK.

After the cache tags have been written, the caches are turned on at a step 188. This is accomplished by setting an appropriate pin to active. It should be noted that most microprocessors can be operated with or without the performance enhancing capabilities of internal caches. Obviously, in this invention, the caches need to be on, as all instructions needed to execute the test programs are contained in the microprocessor's instruction cache. After the caches have been turned on, a process step 190 executes a branch instruction to jump to address 0 in the instruction cache (at the beginning of the compiled and loaded program) and the instruction cache fetch begins from there.

Finally, after the above sequence is executed via the boundary scan, the IEEE 1149.1 controller is reset at a step 192. Resetting may be accomplished by holding the TMS pin (see pins 93 in FIG. 4B) high for five or more TCK cycles. The clock controller is designed so that this action enables the free-running clock to become the microprocessor's internal clock. From this time on, the microprocessor is out of boundary scan mode, and instructions (that were preloaded using SRAM test mode) are fetched from the on-chip instruction cache. The microprocessor executes the program stored in the caches at the full clock rate of the microprocessor's clock pin (e.g., the VCK pin 94 shown in FIG. 4B). The process is completed at 194.

With regard to the step of performing a boot routine (step 184), the boot program used with a SuperSPARC II microprocessor includes the functions described below. The various registers described in these functions are described in "The SPARC Architecture Manual," Version 8, Weaver and Germond, Eds., PTR Prentice Hall, Englewood Cliffs, N.J. (1992), which is incorporated herein by reference for all purposes.

(1) The routine initializes all necessary processor control registers. While this process is necessarily processor specific, for SuperSPARC II microprocessors, the following steps are taken. The super scalar mode bit in the Action register is enabled. Setting the super scalar bit enables the integer pipe line of the SuperSPARC II processor to execute multiple instructions in parallel in a single cycle. The process Interrupt level is set to 4, the current window pointer is initialized to 6 and traps are enabled. The PIL and CWP (current window pointer) are arbitrarily set to a value depending upon the Interrupt levels and register window the test routines are going to use later. Traps are enabled to ensure that the processor faults in case of errors. For each of these steps, see "The SPARC Architecture Manual," Version 8, previously incorporated by reference.

(2) The caches tags are then invalidated and unlocked. The cache data RAMs were already loaded in SRAM test mode.

(3) The memory management unit (MMU) is disabled to prevent all virtual to physical address translations on chip. It should be noted that all instructions needed to execute the program are presumably already loaded in the microprocessor's instruction cache. Of course, more complex programs could run with the MMU enabled.

As noted, the program is executed after the transition step (step 56 of FIG. 2) is completed. While the program executes, it may be important to check the status of the executing program. This will be the case, for example, if a pass or fail status must be generated, or if intermediate data must be extracted from or sent to the microprocessor. In preferred embodiments, this interaction takes place through the IEEE 1149.1 interface.

In some cases, this can be done without any interruption to the executing program (i.e., normal execution of the microprocessor and the JTAG controller can occur concurrently). However, if it becomes necessary to interrupt the program to exchange data between the tester and the microprocessor, it will be necessary to interrupt the program, and a different mode of interaction will be required. In this case, a BSCAN_STOP instruction can be shifted into the IEEE 1149.1 instruction register. This instruction will disable the microprocessor's internal clock, thus freezing the microprocessor's state. Then other operations, such as SRAM read or write, can be performed via boundary scan at low speed. As long as the microprocessor's state is not altered by the data exchange while BSCAN_STOP is in force, the microprocessor's internal clock can be restored by resetting the IEEE 1149.1 controller. This will resume the full speed execution of the stopped program. Repeated stopping and resuming of the program in this manner can be done as needed to properly test the microprocessor.

Figure 9A:
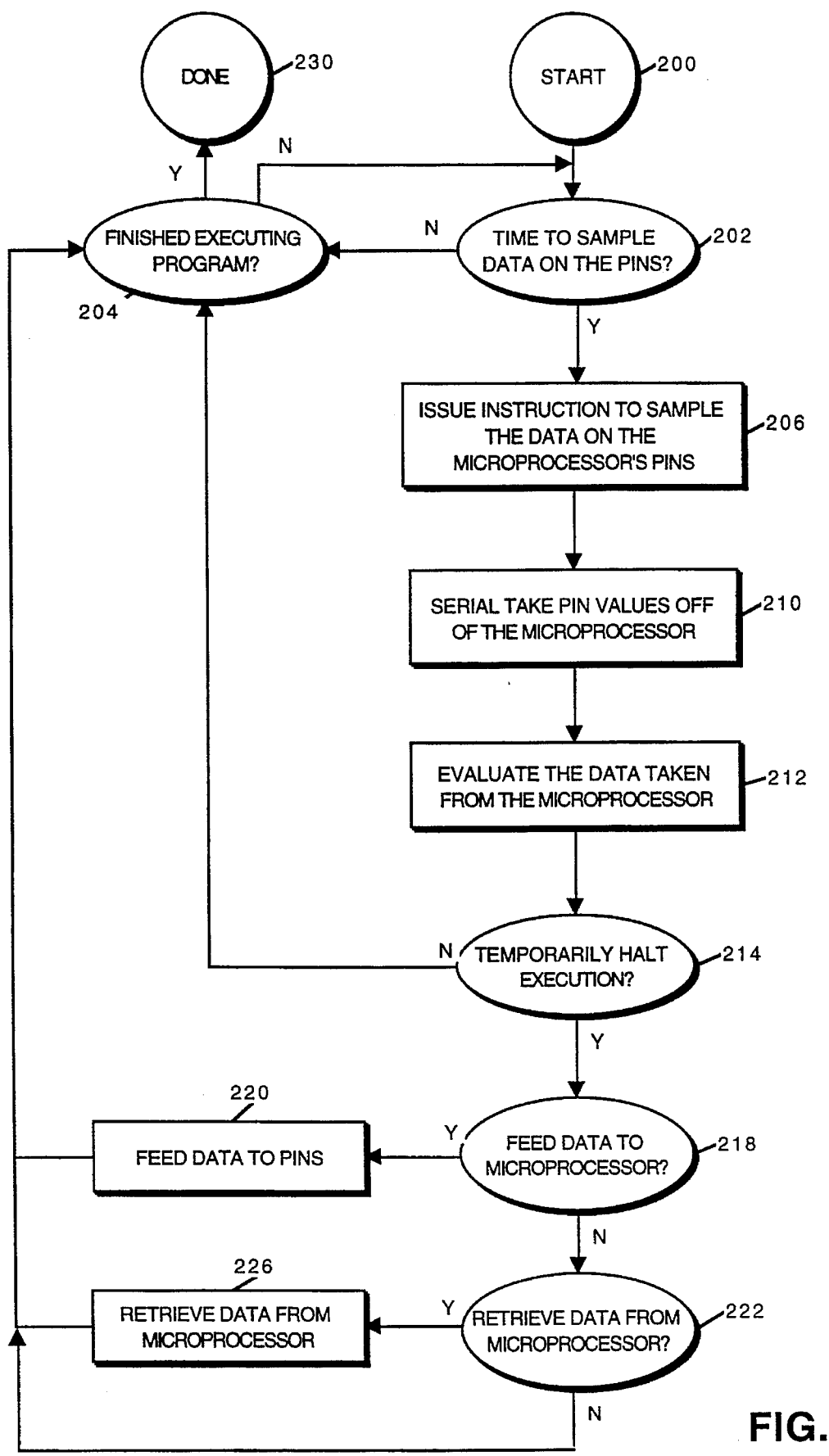
FIG. 9A is a process flow diagram depicting the major steps employed to interact with an executing test program in accordance with this invention.

A preferred method of interacting with an executing program will now be described with reference to FIG. 9A. This process assumes that the program executing on the microprocessor has been written with a diagnostic instruction such that it periodically puts information on the microprocessor pins during execution. This allows the status of the execution to be monitored so predefined actions can be taken as necessary. The process depicted in FIG. 9A begins at 200 and a decision step 202 determines whether it is time to sample the information currently contained on the microprocessor pins. In preferred embodiments, the microprocessor pins are periodically polled by a JTAG controller. If it is not time to sample the pins, a decision step 204 determines whether the program is finished executing. If so, the process is completed at 230.

Assuming that decision step 202 has determined that the microprocessor pins should be sampled, a process step 206 issues an instruction to sample the information on the pins. For example, a "SAMPLE" instruction can be entered into the IEEE 1149.1 instruction register. This instruction (which is an IEEE 1149.1 standard or public instruction) allows for a snapshot of the pin values to be taken and stored in the boundary scan registers (associated with the microprocessor's cells). These values can then be shifted out to the tester serially by a boundary scan shift operation as indicated at a step 210. In this case, the values on the pins could be taken out through the TDO pin of the microprocessor.

Next, a step 212 evaluates the data taken from the microprocessor's pins. Specifically, the tester may examine the values taken from specific pins and compare them to expected values to deduce the status of the program execution. From this information, the process can determine whether to halt execution at a decision step 214. It should be noted that the program continues execute on the microprocessor to this point. If decision step 214 determines that its evaluation does not merit stopping execution, process control returns to decision step 204 which determines whether program is finished executing. Assuming, on the other hand, that decision step 2 14 does determine that execution should be halted, a decision step 218 determines whether it is appropriate to feed data back to the microprocessor. For instance, the status of the program's execution may have indicated that a register should be loaded with a certain value. If such data is required, a process step 220 feeds that data to the microprocessor's pins. This step will be described in more detail below with reference to FIG. 9B. After step 220 is completed, process control returns to decision step 204. If the question posed at decision step 218 is answered in the negative, a decision step 222 determines whether to retrieve data from within the microprocessor. This may be the case, if the evaluation step (step 212) indicates that further information could be gleaned by retrieving data stored in the microprocessor's caches or registers. If this is true, a process step 226 retrieves the relevant data from the microprocessor. Process control then returns to decision step 204. The process of retrieving data from the microprocessor is described below with reference to FIG. 9C.

It should be noted that this flow represents a preferred embodiment, but does not describe all approaches to interacting with an executing program allowed by the present invention. For example, the process of feeding data to the microprocessor (step 220) or retrieving data from the microprocessor (step 226) can be performed at any time, without requiring a preliminary evaluation of data on the microprocessor's pins.

Figure 9B:
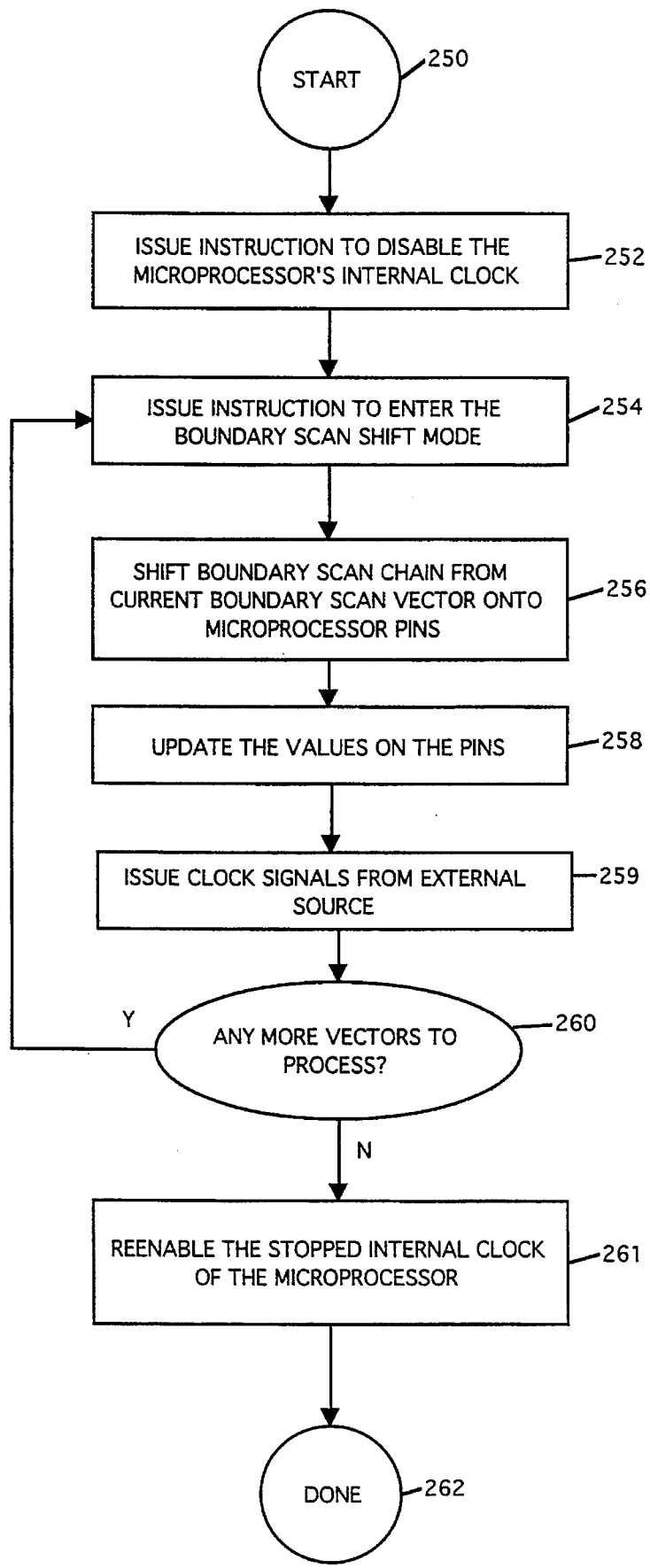
FIG. 9B is a process flow diagram detailing the steps employed to load data into the microprocessor while execution of a program is frozen.

The process of feeding values to a microprocessor's pins in the midst of execution (step 220) is detailed in FIG. 9B. The process begins at 250 followed by a process step 252 which issues an instruction to disable the microprocessor's internal clock. In preferred embodiments, this is accomplished by entering a BSCAN_STOP instruction as described above. This, of course, freezes the execution of the program on the microprocessor. Next, a step 254 issues an instruction to enter the boundary scan shift mode (preferably an IEEE 1149.1 INTEST instruction as described above). Thereafter, a step 256 shifts the values of a boundary scan vector onto the microprocessor pins. Preferably, this is accomplished by providing the boundary scan vector to an IEEE 1149.1 controller as described above. Generally, the boundary scan vector should contain (1) the address of the memory location where the data is to be loaded together with (2) the data itself. Further, the vector should include (3) a bit to set the memory chip mode pin to active and (4) a bit to set a "write" pin on the microprocessor to active. If the data provided to microprocessor is loaded to a register, as opposed to a cache (memory array), the boundary scan vector may simply contain an appropriate assembly language instruction which is designed to write to the desired register.

Next, the values shifted onto the microprocessor pins are updated at a step 258 as described above with reference to FIG. 2. At this point, the values are available to the microprocessor's internal logic but require a certain number of clock cycles (the exact number depending upon the final destination within the microprocessor) to move into the microprocessor. These cycles are provided from an external source (e.g., via an ISSUE_TCK instruction) at a step 259. In some cases, the processor will be in a state that is ready to accept data on pins. When this occurs, the microprocessor's internal clock may be reenabled and the data will be automatically loaded to the specified address.

After the data from the current boundary scan vector has been loaded, a decision step 260 determines whether there are any more vectors to loaded while execution is frozen. If so, process control returns to step 254. If not, a process step 261 reenables the microprocessor's stopped internal clock. In an IEEE 1149.1 interface, the microprocessor's internal clock can be reenabled by simply resetting the IEEE 1149.1 controller. The process is concluded at 262.

Figure 9C:
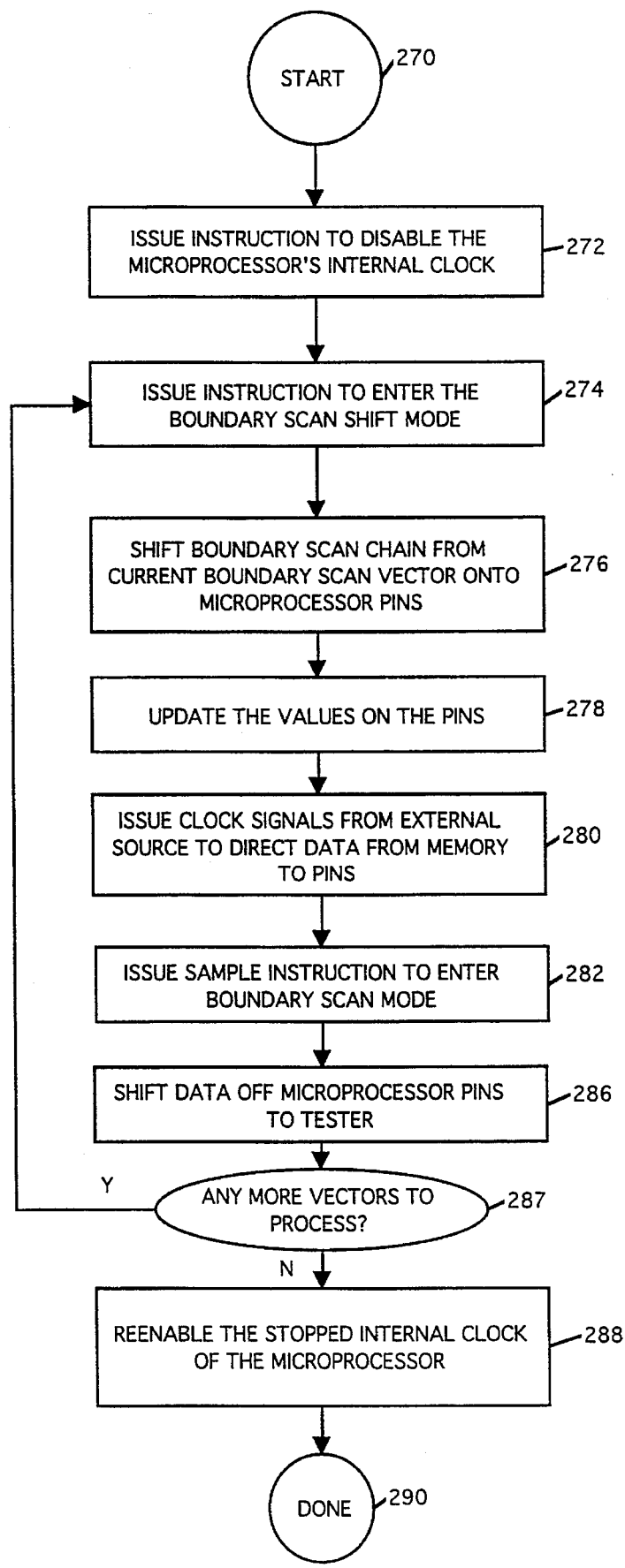
FIG. 9C is a process flow diagram detailing the steps employed to retrieve data from the microprocessor's memory or registers while execution of a program is frozen.

The process of retrieving values from a microprocessor's pins in the midst of execution (step 226 of FIG. 9A) is detailed in FIG. 9C. The process begins at 270 and in step 272 an instruction is issued to disable the microprocessor's internal clock. This step is directly analogous to step 252 as discussed with reference to FIG. 9B. Next, a process step 274 issues an instruction to enter the boundary shift mode. This may be an INTEST instruction as described with reference to step 154 of FIG. 9B. At this point, a step 276 shifts a boundary scan vector onto the microprocessors pins. If a memory location iS to be accessed, this vector will include the address of that memory together with a bit to set a "read" pin of the microprocessor to active. This combination of information will instruct the microprocessor that the memory content at the location specified in the vector's address portion is to be supplied to output pins on the microprocessor. It should be noted that when access to a register is desired, the boundary scan vector will simply include an appropriate assembly language instruction (as a machine language binary instruction) for accessing the desired register.

After the boundary scan vector has been put on the microprocessors pins at step 276, a step 278 updates the values on the pins as discussed above. Thereafter, a step 280 issues clock signals from an external source to direct data from the desired memory location to the pins of the microprocessor. In preferred embodiments, this will be accomplished by providing an ISSUE_TCK signal. At this point, the desired information is contained on the microprocessors pins. To retrieve it, a step 282 issues a sample instruction to enter boundary scan mode. As mentioned above, this instruction may be a "SAMPLE" public IEEE 1149.1 instruction. Thereafter, at step 286, the data on the microprocessor pins is shifted off the pins to the tester via a boundary scan shift operation. As noted, in a JTAG controller, the data is supplied through the TDO pin.

At this point, a decision step 287 determines whether there are any other boundary vectors which contain information required to access additional data within the microprocessor. If not, a process step 288 reenables the stopped internal clock of the microprocessor and normal execution resumes as described above. The process is then completed at 290. If decision step 287 is answered in the affirmative, process control returns to step 274 were another instruction is issued the boundary scan shift mode. Thereafter, the next boundary scan vector is handled as described above.

Although the foregoing invention has been described in some detail for purposes of clarity of understanding, it will be apparent that certain changes and modifications may be practiced within the scope of the appended claims. For instance, although the specification has described an IEEE 1149.1 interface, other interfaces employing low pin counts can be used as well. In addition, the reader will understand that the method described herein can be used in systems other than microprocessor development. For example, the method here taught may be used in microprocessor quality control operations and in software development.

What is claimed is:

1. A method of testing a microprocessor having a plurality of pins, an internal clock, and internal logic, the method comprising the following steps:

(a) providing a compiled test program to be executed on said microprocessor, the test program having a plurality of memory contents, each containing data or an instruction provided by said test program;

(b) disabling the microprocessor's internal clock;

(c) shifting a current memory content as a chain of bits onto the microprocessor's plurality of pins by a boundary scan shift operation;

(d) providing clock cycles from an external source to the microprocessor's internal logic;

(e) loading the data or instruction of the current memory content into a data or instruction cache of the microprocessor;

(f) repeating steps c through e for successive memory contents until the memory contents of the test program has been stored in the data and instruction caches of the microprocessor; and (g) executing said test program.

2. The method of claim 1 wherein steps c through f are controlled by a controller employing an IEEE 1149.1 interface.

3. The method of claim 1 further comprising a step of updating the current memory content on the microprocessor's plurality of pins so that the bit values on the pins are shifted to registers which are accessible to the microprocessor's internal logic.

4. The method of claim 3 wherein the step of updating is controlled by a controller employing an IEEE 1149.1 interface.

5. The method of claim 1 wherein the microprocessor has a memory chip mode in which data can be loaded into the microprocessor's data and instruction caches from its pins as if the microprocessor were a memory chip, and wherein the step of loading the data or instruction of the current memory content into a data or instruction cache of the microprocessor is conducted in said memory chip mode.

6. The method of claim 5 further comprising a step of setting the microprocessor in said memory chip mode before said step of loading the data or instruction of the current memory content into a data or instruction cache of the microprocessor.

7. The method of claim 1 wherein the step of providing a compiled test program provides the test program as a file of boundary scan vectors, each such vector representing a boundary pin bit pattern for a memory content.

8. The method of claim 7 wherein each boundary scan vector provided with the compiled test program includes address and data bits aligned within the vector such that they will be shifted onto corresponding address and data pins of the microprocessor when the step of shifting the current memory content onto the microprocessor's plurality of pins is completed.

9. The method of claim 8 wherein each boundary scan vector further includes a memory chip mode bit which is set to be active and is aligned within the vector such that it will be located on a corresponding memory chip mode pin of the microprocessor when the step of shifting the current memory content onto the microprocessor's plurality of pins is completed.

10. The method of claim 1 further comprising a step of transitioning the microprocessor to a normal execution mode before said step of executing said test program.

11. The method of claim 10 wherein the step of transitioning the microprocessor to a normal execution mode includes the following steps:

resetting the microprocessor;

writing tags for the caches;

turning on the caches;

jumping to the first instruction of the compiled program; and reenabling the microprocessor's internal clock.

12. The method of claim 1 wherein said step of executing includes a step of sampling information put onto the microprocessor pins while the system is executing.

13. The method of claim 12 wherein the step of sampling information put onto the microprocessor pins is performed by a boundary scan shift operation.

14. The method of claim 1 further comprising the following steps:

freezing execution of the compiled program on the microprocessor by disabling the microprocessor's internal clock;

retrieving information stored in the microprocessor while execution is frozen; and resuming execution of the compiled program on the microprocessor by reenabling the microprocessor's internal clock.

15. The method of claim 1 further comprising the following steps:

freezing execution of the compiled program on the microprocessor by disabling the microprocessor's internal clock;

loading information into the microprocessor while execution is frozen; and resuming execution of the compiled program on the microprocessor by reenabling the microprocessor's internal clock.

16. A system for executing a test program on a microprocessor having internal caches, an internal clock, and a plurality of pins for inputting and outputting information, the system comprising:

a test controller for controlling the loading of memory contents from a compiled program to the microprocessor's internal caches, said test controller being capable of inputting information to the microprocessor through a subset of the plurality of pins via boundary scan shift operations;

electrical connectors between said test controller and said subset of the microprocessor's pins; and a clock controller which has the capability of disabling the microprocessor's internal clock, and also has the capability of providing clock signals from an external source to the microprocessor.

17. The system of claim 16 wherein the test controller is provided as an add-on card in a workstation.

18. The system of claim 16 wherein the test controller is capable of providing said boundary scan shift operations pursuant to IEEE 1149.1.

19. The system of claim 16 further comprising logic for operating said microprocessor in a memory chip mode whereby information can be loaded into the microprocessor's internal caches from its pins as if the microprocessor was a memory chip.

20. The system of claim 19 wherein said logic for operating the microprocessor in a memory chip mode is provided on the microprocessor.

21. The system of claim 16 further comprising a board including connections for testing multiple microprocessors simultaneously with said test controller.

22. The system of claim 16 wherein said clock controller is provided on the microprocessor and said test controller is provided external to said microprocessor.

23. The system of claim 22 wherein said test controller includes a clock which is external to the microprocessor.

24. The system of claim 23 wherein said clock controller has capability of providing clock signals from said clock of the test controller to the microprocessor.

* * * * *